(12) United States Patent
Wilcox

(10) Patent No.: US 7,434,775 B2
(45) Date of Patent: Oct. 14, 2008

(54) BRACKET FOR HOLDING ACCESSORIES ON A BOAT

(76) Inventor: Kennth Wilcox, 401 Covina St., Dayton, OH (US) 45431-2225

( * ) Notice: Subject to any disclaimer, the term of this patent is extended or adjusted under 35 U.S.C. 154(b) by 0 days.

(21) Appl. No.: 11/760,900

(22) Filed: Jun. 11, 2007

(65) Prior Publication Data

US 2007/0227436 A1    Oct. 4, 2007

Related U.S. Application Data

(63) Continuation-in-part of application No. 10/928,237, filed on Aug. 27, 2004, now Pat. No. 7,232,099.

(51) Int. Cl.
*G09F 7/18* (2006.01)

(52) U.S. Cl. ............ 248/228.1; 248/228.5; 248/231.91; 43/21.2

(58) Field of Classification Search .......... 248/535, 248/540, 229.1, 229.14, 229.24, 227.4, 228.5, 248/231.61, 228.3, 228.1, 205.1, 214, 217.4, 248/220.21, 220.22, 224.8

See application file for complete search history.

(56) References Cited

U.S. PATENT DOCUMENTS

| | | | |
|---|---|---|---|
| 1,304,787 A | 5/1919 | MacNeale | |
| 1,462,505 A | 7/1923 | Hunt | |
| 3,747,288 A * | 7/1973 | Grimelli | ........................ 52/23 |
| 3,753,359 A | 8/1973 | Frey | |
| 4,028,705 A | 6/1977 | Loyd | |
| 4,149,694 A | 4/1979 | Verini | |
| 4,298,771 A | 11/1981 | Olashaw | |
| 4,341,375 A | 7/1982 | Romanin | |
| 4,367,858 A | 1/1983 | Ziaylek, Jr. | |
| 4,380,109 A | 4/1983 | Pray | |
| 4,528,768 A | 7/1985 | Anderson | |
| 4,760,986 A | 8/1988 | Harrison | |
| 4,844,208 A | 7/1989 | Veness | |
| 4,883,494 A | 11/1989 | Cooper | |
| 5,142,809 A | 9/1992 | O'Brien et al. | |
| 5,398,398 A | 3/1995 | Williams et al. | |
| 5,492,032 A | 2/1996 | Hartman | |
| 5,860,197 A | 1/1999 | Fox | |
| 6,405,985 B1 | 6/2002 | Glebe | |
| 6,498,859 B2 | 12/2002 | Kuerti et al. | |
| 6,561,736 B1 | 5/2003 | Doleshal | |
| 6,588,362 B1 | 7/2003 | Cope | |
| 6,591,541 B1 | 7/2003 | Cummings | |
| 6,643,973 B1 | 11/2003 | Smith | |

* cited by examiner

*Primary Examiner*—Korie Chan
(74) *Attorney, Agent, or Firm*—R. William Graham

(57) ABSTRACT

A bracket in combination with a boat surface for holding a boat accessory on a boat includes a boat surface, a mounting plate having a first side and a second side, a slotted exterior surface extending through the first side and defined by raised portions on either side thereof, each of the raised portions having an opening therethrough, a plurality of connectors, wherein each one of the connectors extends through one of each the openings to connect the mounting plate to the boat surface, wherein the boat surface and the slotted surface and raised portions define a slotted area therebetween, and a support plate having a first end configured to be removably received and retained in the slotted area in a manner which provides a second end of the support plate to operably connect an accessory.

13 Claims, 7 Drawing Sheets

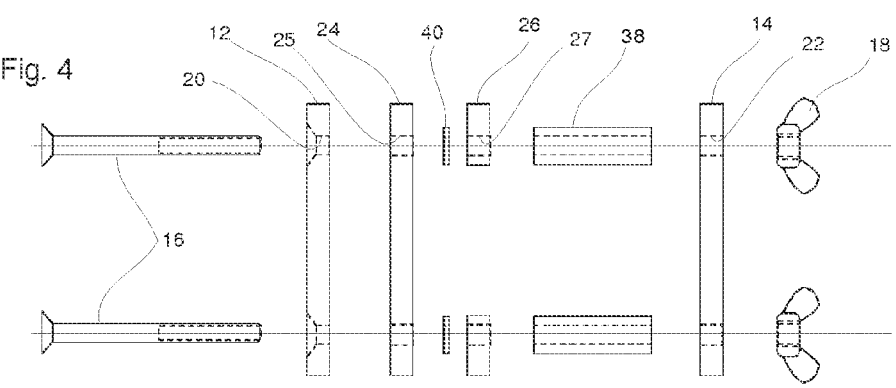
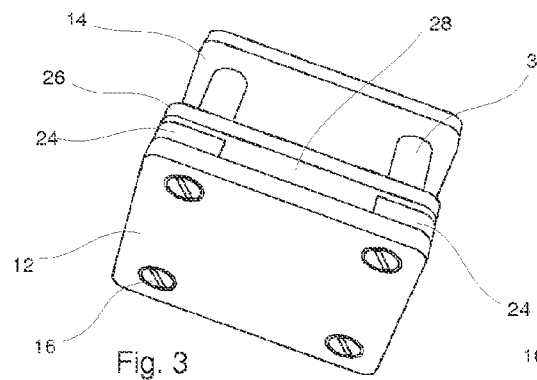
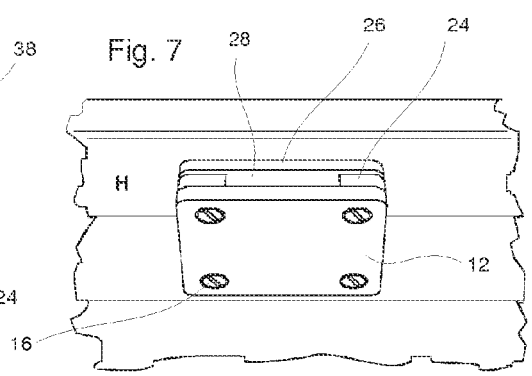

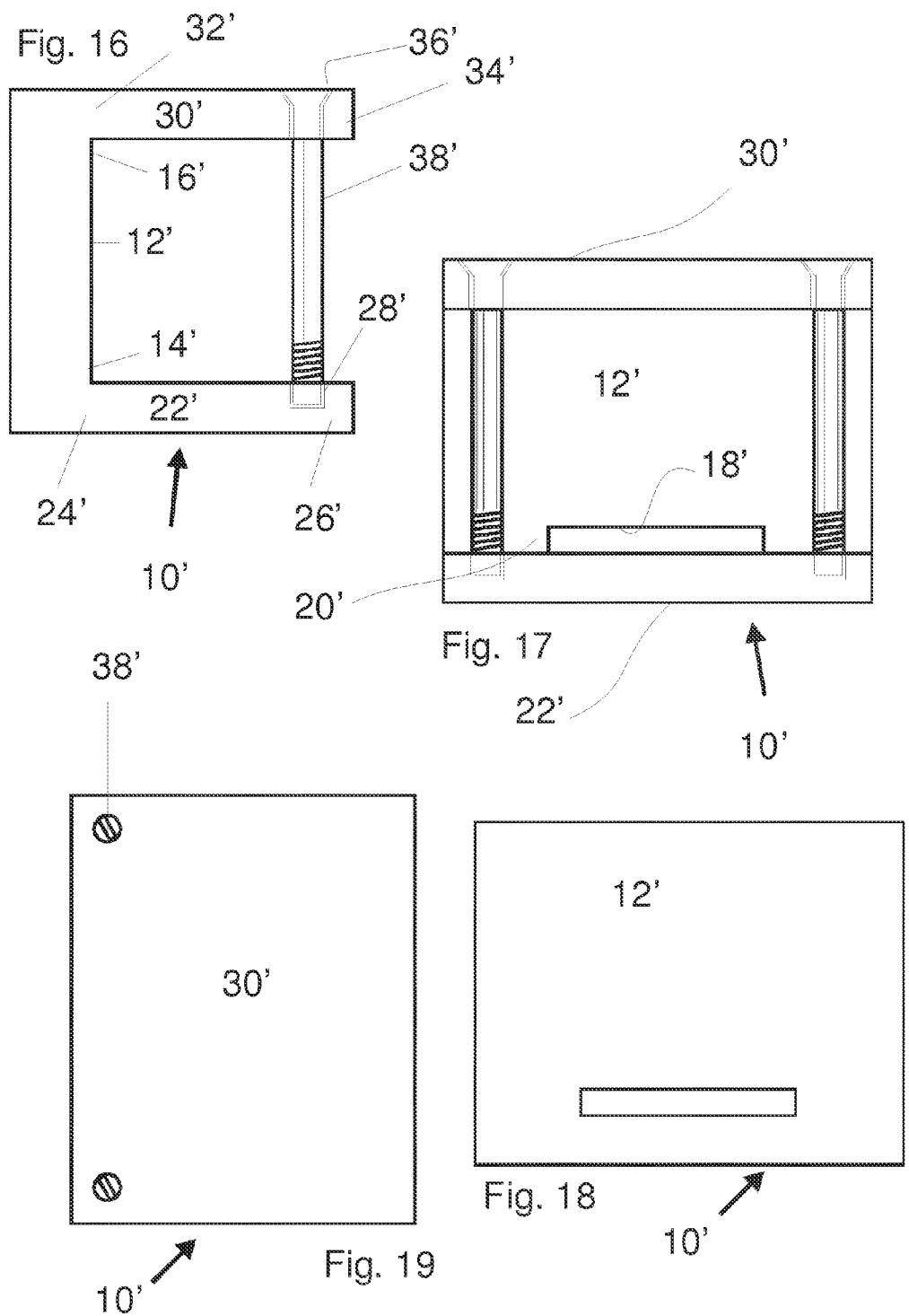

BRACKET FOR HOLDING ACCESSORIES ON A BOAT

This is a continuation in part of U.S. Ser. No. 10/928,237 filed Aug. 27, 2004 now U.S. Pat. No. 7,232,099.

BACKGROUND OF THE INVENTION

1. Field of the Invention

The present invention relates generally to holders and, more particularly, to a holder which for supporting a variety of accessories on a boat railing or boat side. The accessory holder of the invention includes a bracket for supporting a fishing rod, a table, depth meter, etc.

2. Description of the Prior Art

Boating is an activity which typically requires a significant portion of the day. While on a boat, there is often limited space for various items brought for a day's excursion. Fishing is often an activity accompanying boating. Accordingly, there are a number of fishing rod holders which exist to hold the rod while a person waits for a fish to bite. Prior fishing rod holders typically adapt to boat railing.

It is desirable to provide a multi-purpose holder for holding various accessories. It is also desirable to have a holder which permits a person to quickly change out holding such various accessories. Prior art does not teach or suggest a bracket for holding accessories which has the above desirable features as well as those apparent in the described invention herein. Other advantages of the present invention over the prior art also will be rendered evident.

SUMMARY OF THE INVENTION

It is an object to enhance boating experience.

It is a further object to enhance a boat's functionality.

It is an object to provide a bracket for holding an accessory on a boat.

It is still another object to provide a bracket which holds multiple accessories on a boat.

It is still a further object to provide a bracket which enables quick exchange of accessories on a boat.

Accordingly, the invention is directed to a bracket in combination with a boat surface for holding a boat accessory on a boat, which includes a boat surface, a mounting plate having a first side and a second side, a slotted exterior surface extending through the first side and defined by raised portions on either side thereof, each of the raised portions having an opening therethrough, a plurality of connectors, wherein each one of the connectors extends through one of each the openings to connect the mounting plate to the boat surface, wherein the boat surface and the slotted surface and raised portions define a slotted area therebetween, and a support plate having a first end configured to be removably received and retained in the slotted area in a manner which provides a second end of the support plate to operably connect an accessory.

In another embodiment, there is provided a bracket for holding accessories on a boat rail. The bracket includes a first mounting plate portion having a first end and a second end, a slotted exterior surface extending through the first end and defined by raised portions on either side thereof, a second mounting plate portion having a first end connected to the raised portions of the first end of the first mounting plate portion and defining a slotted area therebetween and having a second end extending laterally from the first mounting plate portion and includes at least one opening therethrough, a third mounting plate portion having a first end connected to the second end of the first mounting plate portion and having a second end extending laterally from the first mounting plate portion and includes at least one opening wherein each opening in the second mounting plate portion aligns with the opening in the third mounting plate portion, at least one removable connector extending through one of each the aligned openings to interconnect the second ends of the second and the third mounting plate portions, such that the boat rail can be removably retainably disposed between the mounting plate portions and the connector; and a support plate having a first end configured to be removably received and retained in the slotted area in a manner which provides a second end of the support plate to operably connect an accessory.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 3 is a perspective view of one part of an embodiment of the invention.

FIG. 4 is an exploded view of the part of FIG. 3.

FIG. 7 is a perspective view of another part of another embodiment of the invention.

FIG. 16 is a side view of yet another embodiment of the invention.

FIG. 17 is a front view of the embodiment in FIG. 16.

FIG. 18 is a top view of the embodiment in FIG. 16.

FIG. 19 is a back view of the embodiment in FIG. 16.

DESCRIPTION OF THE PREFERRED EMBODIMENTS

Figure 1:
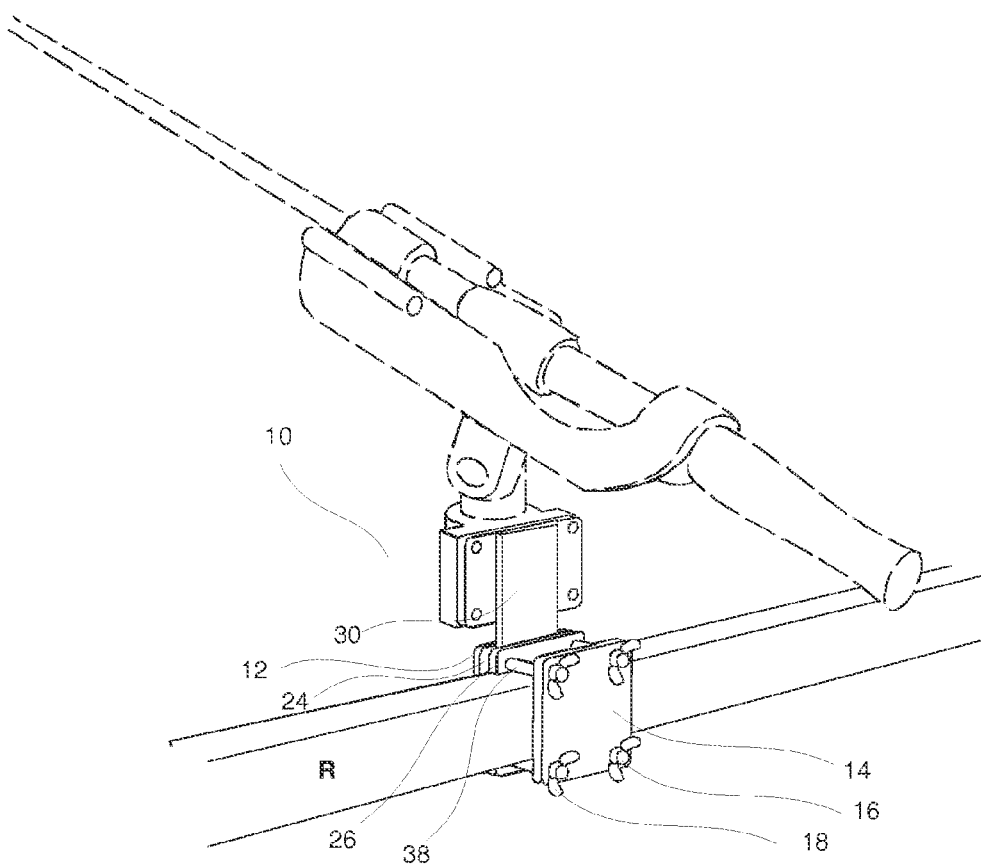
FIG. 1 is a perspective view of the invention in use.

Referring now to the drawings, a bracket for holding accessories on a boat is generally referred to by the numerals 10 and 10' and 100'. In FIGS. 16-21, bracket 10' and 100' is disclosed.

In one embodiment, there is provided bracket 10' for holding accessories on a boat rail R. The bracket 10' includes a first mounting plate portion 12' having a first end 14' and a second end 16'. A slotted exterior surface 18' extends through the first end 14' and is defined by raised portions 20' on either side thereof. A second mounting plate portion 22' has a first end 24' connected to the raised portions 20' of the first end 14' of the first mounting plate portion 12'. A slotted area is defined by slotted exterior surface 18', raised portions 20' and first end 24'. A second end 26' extends laterally from the first mounting plate portion 12' and includes openings 28' therein and can be threaded or which can extend through end 26' if so desired and connect to threaded nuts not shown.

A third mounting plate portion 30' has a first end 32' connected to the second end 16' of the first mounting plate portion 12' and has a second end 34' extending laterally from the first mounting plate portion 12' which includes openings 36'. Each opening 28' in the second mounting plate portion 22' aligns with an opening 36' in the third mounting plate portion 30'.

Removable connectors 38' extends through a respective pair of aligned openings 28' and 36' to interconnect the second ends 26' and 34' of the second and the third mounting plate portions 22' and 30'. In this regard, the boat rail R can be removably retainably disposed between the mounting plate portions 12', 22', 30' and the connectors 38'. A support plate 30, 32, 34 or 36 for example as seen in FIGS. 12-15 can be removably received and retained in the slotted area in a manner to operably connect an accessory.

The bracket 100' in combination with a boat surface H are configured for holding a boat accessory on a boat. The bracket 100' includes a mounting plate 112' having a first side 114' and a second side 116'. A slotted exterior surface 118' extends through the first side 114' and is defined by raised portions 120' on either side thereof. Each of the raised portions 120' has openings 122' therethrough. A plurality of connectors 124' are provided wherein each extends through one of each the openings 122' to connect the mounting plate 112' to the boat surface H. The boat surface H, the slotted surface 118' and raised portions 120' define a slotted area therebetween, and in a like manner support plate 30, 32, 34 or 36 for example as seen in FIGS. 12-15 can be removably received and retained in the slotted area in a manner which provides the support plate to operably connect an accessory.

The bracket 10 includes a pair of mounting plates 12 and 14 which are laterally spaced apart from one another and interconnected by a plurality of threaded screws 16 and wing nuts 18.

Figure 2:
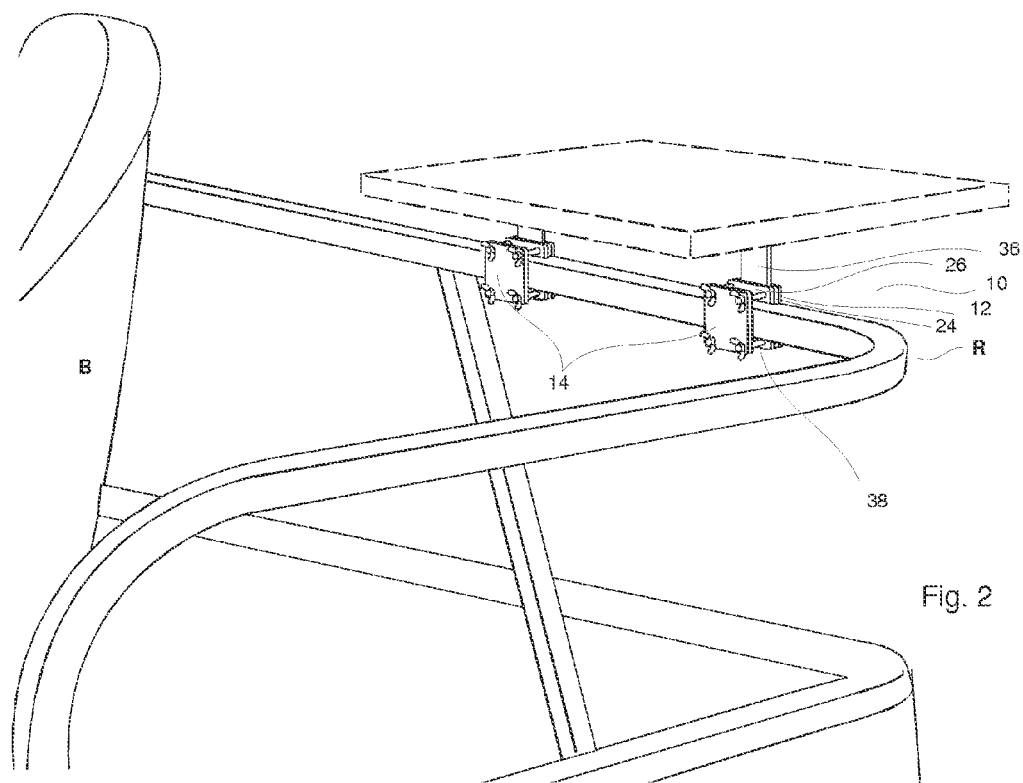
FIG. 2 is a perspective view of the invention in another mode of use.
Figure 5:
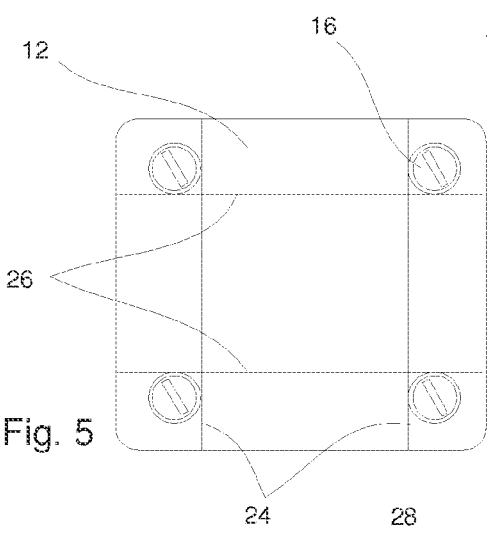
FIG. 5 is an end view of the part of FIG. 3.
Figure 6A:
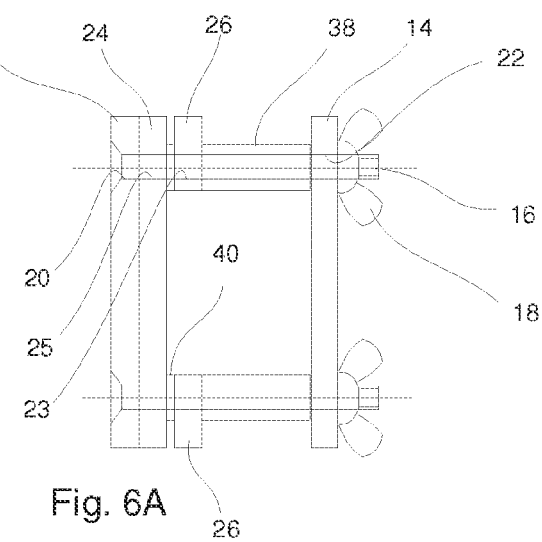
FIG. 6A is a side view of the part of FIG. 3.
Figure 6B:
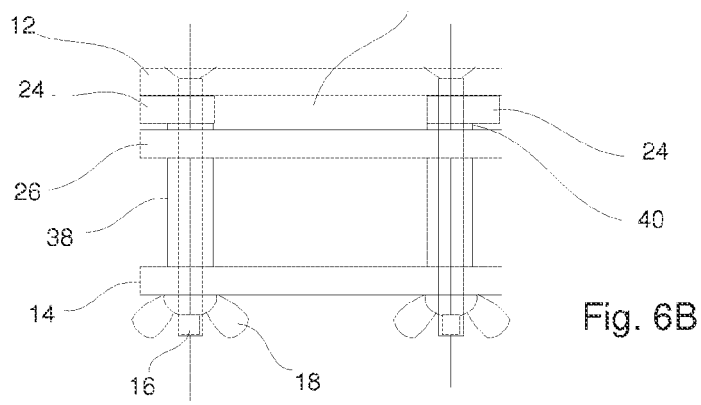
FIG. 6B is another side view of the part of FIG. 3.

The mounting plates 12 and 14 have a set of aligned open through surfaces 20 and 22, respectively, through which the screws 16 extend and are retained by the wing nuts 18. As seen in the embodiment of FIGS. 4 and 6A and 6B, for example, connected between the mounting plates 12 and 14 to the screws 18 are a set of interconnecting plates 24 which form a slotted area 28 therebetween to removably receive support plate 30, 32, 34, or 36, as seen in FIGS. 12-15, which can be of a thickness approximate that of interconnecting plates 24. Interconnecting plates 24 and 26 include open through surfaces 25 and 27, respectively, which align with open through surfaces 20 and 22, respectively, to receive the screw therethrough. FIG. 1 depicts the use of support plate 30 whereas FIG. 2 depicts the use of support plate 36, for example, both of which are configured to attach to an accessory such as a fishing rod holder or a table. Modifications of this aspect of the invention are believed to be within the scope of the claims appended hereto.

Each screw 16 preferably has a sleeve 38, which can be of a suitable plastic, for example, which extends about a portion thereof and which serves as a spacer between one of mounting plate 14 and the interconnecting plates 26 and each sleeve 38 is approximately equal to the width of a rail R of a boat B as seen in FIG. 2, for example. The sleeves 38 are plastic preferably to permit slight compression and assure a tight fit connection to the rail R as seen in FIGS. 4 and 6A and 6B. Further, thin washers 40 are provided about the screws 16 between interconnecting plates 24 and 26 which also act spacers to provide additional slight clearance in the slotted area 28 for the insertion and removal of the support plates 30, 32, 34, or 36. In this embodiment, it is contemplated that all the plates 12, 14, 24, 26 and 30 can be machined from material having common stock thickness.

Figure 9:
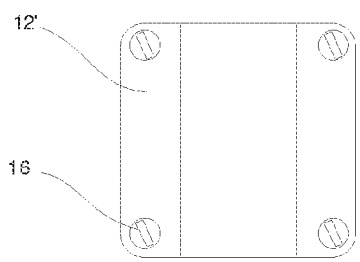
FIG. 9 is a top view of FIG. 8.
Figures 10A, 10B:
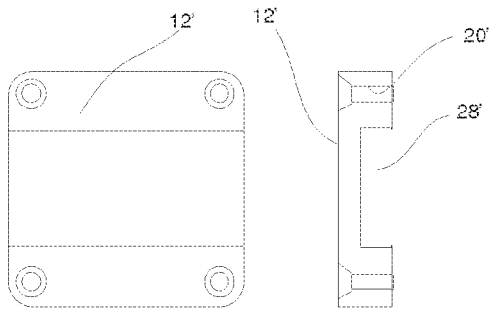
FIG. 10A is a top view of a part of another embodiment.
FIG. 10B is a side sectional view of the part in FIG. 10A.
Figure 8:
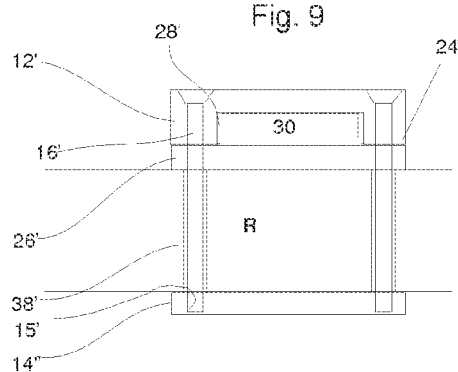
FIG. 8 is a side view of a part of another embodiment.

FIGS. 8 and 9 show an alternative embodiment, wherein the plates 24 described above can be integrally formed as part of plate 12, such that a new mounting plate 12' is formed with raised sides 24' with a slotted surface 28' formed therein as seen in FIGS. 10A-B. The raised sides 24' can be of a size such that when disposed against interconnecting plate 26' there is provided slight clearance for the insertion and removal of the support plates 30, 32, 34, or 36 as similarly described above. Thus, the need for the washers 40 are not needed in this embodiment, however, different thickness stock material is utilized. Further, plate 14' can be modified to include threaded openings 15' to provide for threading of the screws 16' directly thereto. Sleeve 38' can be similarly formed as described above for sleeve 38.

Figure 11:
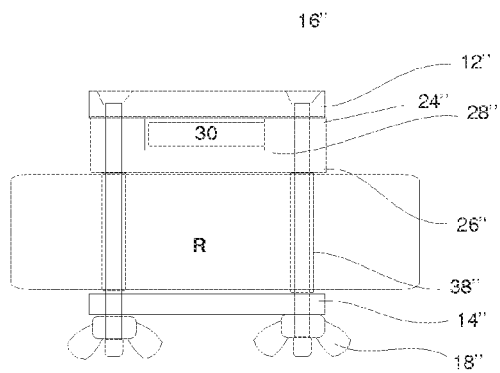
FIG. 11 is an end view of a part of another embodiment.
Figure 12:
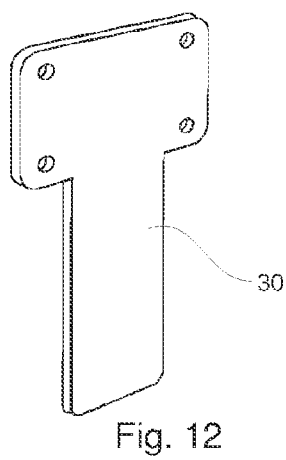
FIG. 12 is a perspective view of a support plate for use in the invention.
Figure 13:
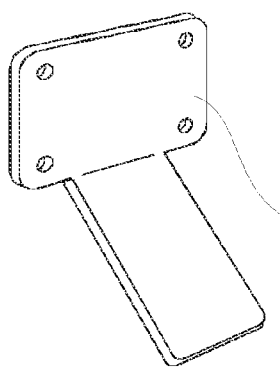
FIG. 13 is a perspective view of another support plate for use in the invention.
Figure 14:
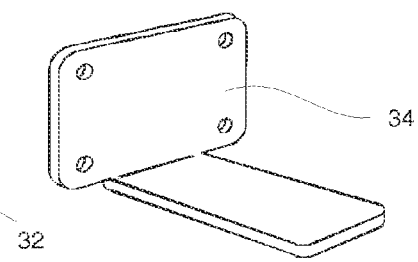
FIG. 14 is a perspective view of yet another support plate for use in the invention.
Figure 15:
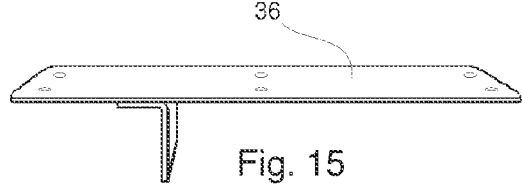
FIG. 15 is a perspective view of another support plate for use in the invention.
Figure 21:
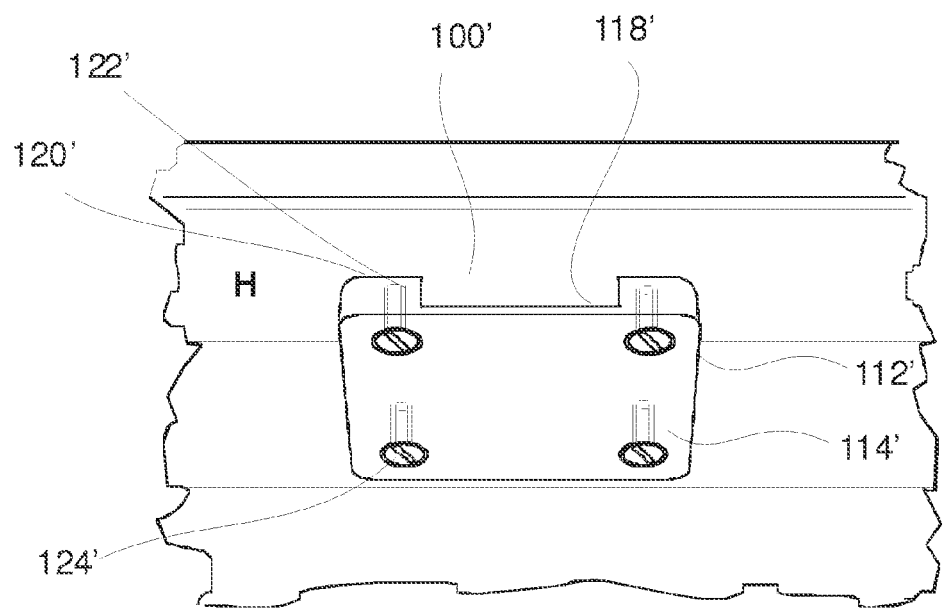
FIG. 21 is a perspective of an embodiment of the invention.
Figure 20:
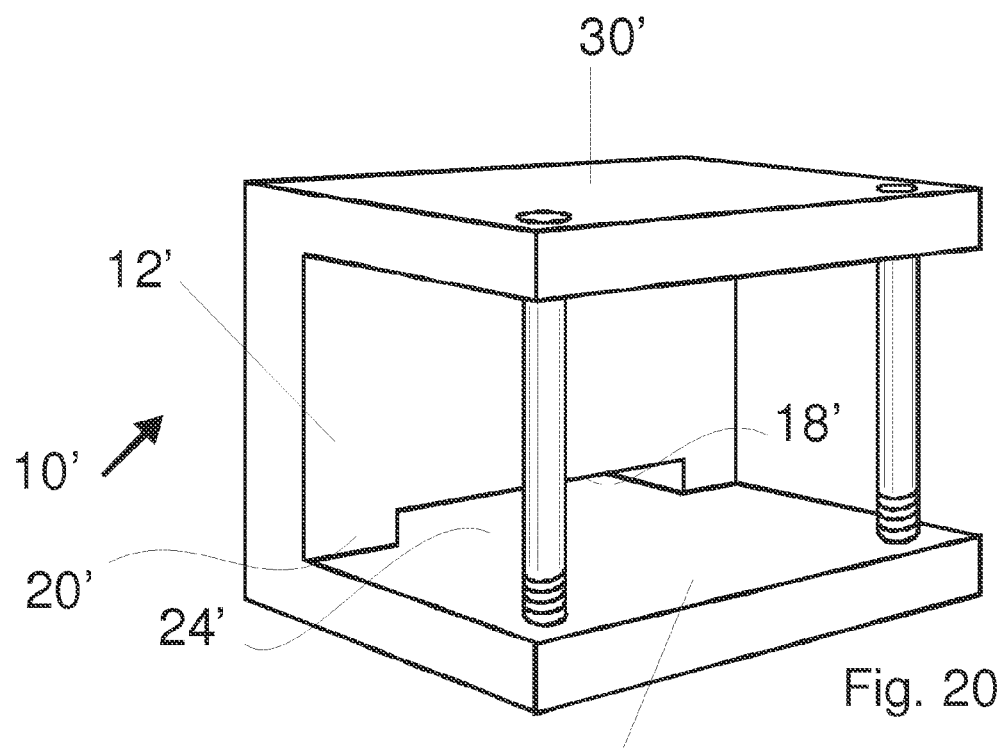
FIG. 20 is a perspective view of the embodiment in FIG. 16.

FIG. 11 shows yet another embodiment wherein the plates 24 and 26 have been integrally formed into plate 26" with raised portions 24". Here, sleeve 38" is disposed between plate 14" and plate 26" and can be similarly formed to that of plate 12'. Plate 12" can be similarly formed to that of plate 12 described hereinabove.

Another embodiment is shown in FIG. 7 wherein a direct mount to the boat hull H is depicted. Here, the use of plates 12, 24 and 26 and screws can be employed to hold one of the plates enable support of the support plates 30, 32, 34, or 36. Alternatively, plates 12' and plate 26' can be employed. It is readily conceived that other variations of these components or modifications thereof can be employed and should be covered by the claims appended hereto. The present invention provides a unique bracket for mounting to boats and boat railings, such as railing on pontoon boats.

The above described embodiments are set forth by way of example and are not for the purpose of limiting the present invention. The invention can be configured to receive and retain another rail configuration, such as cylindrical, wherein the mounting portion can be configured to receive such shape and the mounting plate portions can be made of semi-resilient material for example to permit a snap fit for example. It will be readily apparent to those skilled in the art that obvious modifications, derivations and variations can be made to the embodiments without departing from the scope of the invention. Accordingly, the claims appended hereto should be read in their full scope including any such modifications, derivations and variations.

What is claimed is:

1. A bracket for holding accessories on a boat rail, which includes:
    a first mounting plate portion having a first end and a second end, a slotted exterior surface extending through said first end and defined by raised portions on either side thereof;
    a second mounting plate portion having a first end connected to said raised portions of said first end of said first mounting plate portion and defining a slotted area therebetween and having a second end extending laterally from said first mounting plate portion and includes at least one opening therethrough;
    a third mounting plate portion having a first end connected to said second end of said first mounting plate portion and having a second end extending laterally from said first mounting plate portion and includes at least one opening wherein each opening in said second mounting plate portion aligns with said opening in said third mounting plate portion;

at least one removable connector extending through one of each said aligned openings to interconnect said second ends of said second and said third mounting plate portions, such that the boat rail can be removably retainably disposed between said mounting plate portions and said connector; and a support plate having a first end configured to be removably received and retained in said slotted area in a manner which provides a second end of said support plate to operably connect an accessory.

2. The bracket for holding accessories on a boat rail of claim 1, wherein said first mounting plate portion is of a length greater than a width of the boat rail.

3. The bracket for holding accessories on a boat rail of claim 2, which includes a plurality of sleeves, each sleeve having an opening therethrough to receive one of said connectors therethrough.

4. The bracket for holding accessories on a boat rail of claim 3, which includes a spacer operably disposed between said second mounting plate portion and said third mounting plate portion.

5. The bracket for holding accessories on a boat rail of claim 1, wherein said mounting plate portions are integrally formed.

6. The bracket for holding accessories on a boat rail of claim 1, wherein each said connector includes a threaded screw and threaded nut.

7. The bracket for holding accessories on a boat rail of claim 1, wherein each connector includes a threaded screw and said openings in said second end of one of said second mounting plate portion and said third mounting plate portion are threaded.

8. A bracket for holding accessories on a boat rail, which includes:

a first mounting plate portion having a first end and a second end, a slotted surface extending through said first mounting plate portion;

a second mounting plate portion having a first end connected to said first end of said first mounting plate portion and having a second end extending laterally from said first mounting plate portion and includes at least one opening therethrough;

a third mounting plate portion having a first end connected to said second end of said first mounting plate portion and having a second end extending laterally from said first mounting plate portion and includes at least one opening wherein each opening in said second mounting plate portion aligns with said opening in said third mounting plate portion;

said first mounting plate portion, said second mounting plate portion and said third mounting plate portion configured to receive and retain the boat rail;

at least one removable connector extending through one of each said aligned openings to interconnect said second ends of said second and said third mounting plate portions, such that the boat rail can be removably retainably disposed between said mounting plate portions and said connector; and a support plate having a first end configured to be removably received and retained in said slotted surface in a manner which provides a second end of said support plate to operably connect an accessory.

9. The bracket for holding accessories on a boat rail of claim 8, which includes a plurality of sleeves, each sleeve having an opening therethrough to receive one of said connectors therethrough.

10. The bracket for holding accessories on a boat rail of claim 8, which includes a spacer operably disposed between said second mounting plate portion and said third mounting plate portion.

11. The bracket for holding accessories on a boat rail of claim 8, wherein said mounting plate portions are integrally formed.

12. The bracket for holding accessories on a boat rail of claim 8, wherein each said connector includes a threaded screw and threaded nut.

13. The bracket for holding accessories on a boat rail of claim 8, wherein each connector includes a threaded screw and said openings in said second end of one of said second mounting plate portion and said third mounting plate portion are threaded.

\* \* \* \* \*